United States Patent [19]

Houck et al.

[11] 4,060,445

[45] Nov. 29, 1977

[54] BUILDING DRUM FOR TIRES AND CYLINDRICAL ARTICLES HAVING AXIALLY SPACED BEADS

[75] Inventors: Staley J. Houck, Akron; Michael W. Smith, Mogadore, both of Ohio

[73] Assignee: The Goodyear Tire & Rubber Company, Akron, Ohio

[21] Appl. No.: 607,325

[22] Filed: Aug. 25, 1975

[51] Int. Cl.$^2$ ............................. B29H 17/16; B29H 17/22
[52] U.S. Cl. ................................... 156/414; 156/132; 156/401; 242/72 B; 279/2 R
[58] Field of Search ........... 156/123, 132, 133, 394 R, 156/398, 400, 401, 403, 414–420; 242/72; 279/2

[56] References Cited

U.S. PATENT DOCUMENTS

| | | | |
|---|---|---|---|
| 2,145,806 | 1/1939 | Schnedarek | 156/416 |
| 2,182,176 | 12/1939 | Maranville | 156/132 |
| 2,838,091 | 6/1958 | Kraft | 156/132 |
| 2,943,668 | 7/1960 | Trevaskis et al. | 156/401 |
| 2,998,049 | 8/1961 | Winslow | 156/401 |
| 3,434,897 | 3/1969 | Caretta et al. | 156/132 |
| 3,476,633 | 11/1969 | Henley | 156/415 |
| 3,542,624 | 11/1970 | Nadler et al. | 156/401 |
| 3,647,598 | 3/1972 | Gazuit | 156/415 |

FOREIGN PATENT DOCUMENTS

| | | | |
|---|---|---|---|
| 1,284,081 | 11/1968 | Germany | 156/394 |
| 880,145 | 10/1961 | United Kingdom | 156/416 |

*Primary Examiner*—Charles E. Van Horn
*Assistant Examiner*—John E. Kittle
*Attorney, Agent, or Firm*—F. W. Brunner; R. S. Washburn

[57] ABSTRACT

A simple low cost building drum, free of axially movable parts for building tires and cylindrical articles having inextensible beads of given diameter therein but spaced axially any selected distance apart, has a single axially and circumferentially continuous radial expandable membrane overlying a thick-walled cylinder of deformable rubbery material the full axial length of which is expandable radially to wrap the membrane against beads placed about the drum and to divide the membrane into a non-inflatable center section and two inflatable end sections each axially outboard of a respective bead. The thick-walled cylinder is expanded radially by inflating an axially extending cylindrical sleeve within control members in the form of four semi-cylindrical strips which prevent bulging outward of the central portion of the thick-walled cylinder and which engage cylindrical flanges of a pair of end rings spaced along the drum's center shaft.

1 Claim, 3 Drawing Figures

BUILDING DRUM FOR TIRES AND CYLINDRICAL ARTICLES HAVING AXIALLY SPACED BEADS

The foregoing abstract is not to be taken as limiting the invention of this application, and in order to understand the full nature and extent of the technical disclosure of this application, reference must be made to the accompanying drawing and the following detailed description.

BACKGROUND OF THE INVENTION

The present invention relates to a building drum for tires and cylindrical articles having axially spaced beads.

Building drums for building tires are well known. Many types, styles, and arrangements are in common use, and even more are described in numerous patents. Some known building drums accommodate only one width, that is, provide no means for adjusting the axial face width of the drum to suit different spacings between the beads of a tire to be built thereon. Other building drums provide means for adjusting the axial face width to accommodate tires of differing axial widths between beads. The width adjustable building drums, however, require that some part or parts be moved axially relative to other parts of the drum and in consequence require an interruption of and time lost from the potential productivity of the building drum.

A principal object of the present invention is to provide a simple, low cost building drum suitable for use in building a variety of tires and like articles having a given bead diameter with beads thereof spaced apart axially of the tire at any selected distance within the range of a particular drum, and without moving any part of the drum axially relative to any other part or otherwise reassembling the drum. A tire of one width can be built immediately following a tire of a different width without delay or interruption. A building drum according to the invention is likewise useful for building airsprings and other cylindrical articles having axially spaced beads therein.

The drum according to the present invention is not adapted for shaping tires or such articles from their cylindrical form as built to a toroidal or other radially expanded tire shape.

The subject matter of the invention is particularly pointed out in the appended claims. A particular embodiment and the best mode now contemplated in the practice of the invention are described hereinbelow, by way of illustration and not of limitation, by and with reference to the drawing forming a part of the present application and in which:

Figure 1:
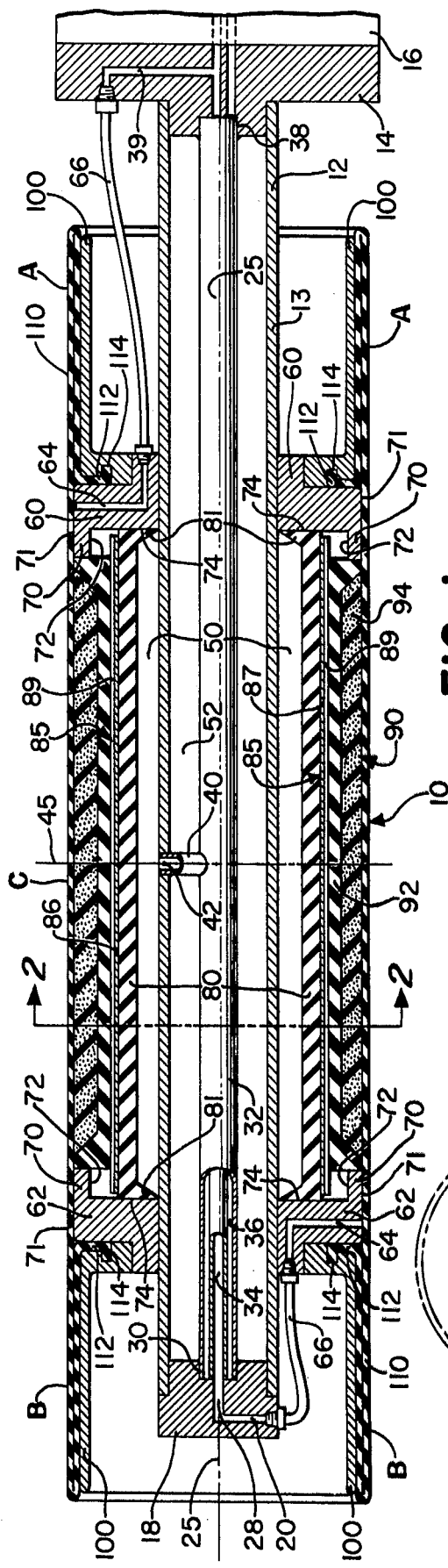
FIG. 1 is an axial elevation in cross-section of a drum in accordance with the invention.

Referring to the drawing, FIG. 1 illustrates in axial cross-section a preferred embodiment of the invention. The drum 10 in FIG. 1 comprises a center shaft 12 formed of a simple cylindrical tube 13. A mounting flange 14 adapted for mounting on a suitable tire building machine spindle 16 is fixed coaxially to one end of the tube. The spindle, preferably, is provided with dual air passages in the usual manner. The distal end of the tube, that is the end remote from the flange, is closed by a cylindrical plug 18. A passage 20 extending radially inward between the outer surface of the plug and the central axis 25 of the shaft is connected to an axial passage 28 terminating in a socket 30 which accommodates the end of a dual air tube 32 containing a central air passage 34 and an annular air passage 36 and which tube extends axially into a corresponding socket 38 provided coaxially in the flange 14. The flange 14 has a similar passage 39 communicating with the central passage 34. The annular air passage 36 is connected by way of a short tube 40 to a port 42 in the tube wall opening outwardly thereof near the mid-axial plane 45 and provides for air flow between the annular air passage 36 and an air chamber 50 later more fully described. Alternatively the tube 32 can be replaced by a single pipe, and the annular space 52 between the pipe and the wall of the tube 13 will serve as the annular air passage.

A pair of rigid end rings 60, 62 are secured rigidly, coaxially and airtightly on the tube 13 at locations spaced respectively equally from the mid-axial plane. For purposes described presently, each end ring has a passage 64 extending between its radially outward surface and its axially outward surface and there connected by a flexible tube 66 to the respective passages 20, 39. Each end ring has a cylindrical flange 70 extending axially toward the other end ring. The cylindrical outer surface 71 of each flange forms a continuing part of the cylindrical outer surface of the ring. The radially inner surface 72 of the flange is cylindrical and provides a radial stop limiting the radially outward movement of control members presently to be described. The radial faces 74 of the end rings inwardly of the flanges 70 are smooth planes perpendicular to the axis of the drum.

Surrounding the shaft 12 and extending between the faces 74 of the end rings is a single radially expansible sleeve 80 of a cured rubber compound and capable of repeated radial expansions and contractions. Optionally but preferably, the sleeve is provided at each of its ends with sealing lips 81 which bear on the faces 74 of the respective rings. The sleeve 80 and the center shaft 12, together with the lips 81 and end rings 60,62 define the air chamber 50, previously mentioned, into which compressed air can be introduced by way of the port 42 and the annular air passage 36 (or the space 52) and from which such air can be exhausted by the same route.

Figure 2:
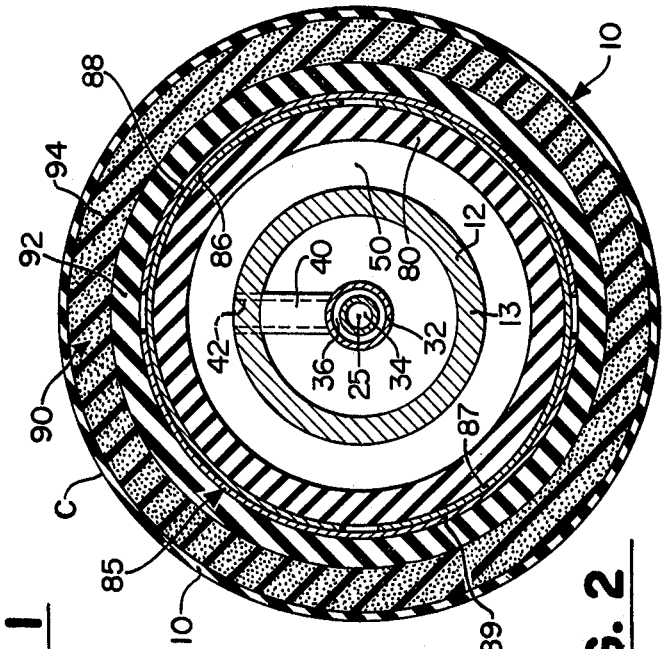
FIG. 2 is a cross-section view, enlarged, taken as indicated by the line 2—2 in FIG. 1.

Immediately surrounding the sleeve 80 is a plurality of control members which, in the present embodiment, are elongated metal strips 85 having arcuate cross-section which extend between the end rings 60,62 terminating close to but not in contact with the radial faces 74 inwardly of the respective flanges 70. In the present embodiment, each of four such strips, arranged in two pairs, are in the form of semi-cylindrical members. The first or inner pair of members 86,87 extend axially of the drum around and in contact with the cylindrical surface of the sleeve 80. The second or outer pair of members 88,89 extend axially between the end rings in surface contact with the outer surface of the inner members 86,87. The longitudinal edges of the outer members 88,89 are displaced angularly about the shaft 12 approximately 90 degrees with respect to the longitudinal edges of the inner members 86,87 as will be seen in FIG. 2. The four members in the arrangement described are relatively stiff parallel to the drum axis but are sufficiently flexible in directions normal to the axis so that they can expand and contract radially together with the expansion and contraction of the sleeve. FIG. 1 illustrates the drum with the sleeve in its collapsed radially inward position, while in FIG. 3 there will be seen the control members 85 expanded radially outwardly by the sleeve 80 to bring the end portions of the control members into radially limiting engagement with the cylindrical inner surfaces 72 of the respective flanges. It will now be apparent, therefore, that the sleeve 80 can expand radially uniformly or nearly uniformly with respect to the axis of the drum free of serious or significant bulging in the vicinity of the mid-circumferential plane.

The control members 85 perform two functions. Firstly, they restrain the sleeve so as to maintain its cylindrical shape during its radial expansion in response to inflating air pressure in the chamber 50. Secondly, they limit the radial expansion of the sleeve to the diameter determined by their abutment against the radially inward cylindrical surfaces 72 of the respective flanges 70.

Surrounding the semi-cylindrical strips forming the control members is a thick-walled, elastically deformable cylinder 90 which extends axially between the flanges. The cylinder 90 is formed of rubber compounds capable of enduring repeated elastic expansion and contraction. In the drum 10 the cylinder 90 is formed of an inner generally cylindrical portion 92 having radially outwardly turned ends. This portion is compounded of a rubber-like material and cured to have a greater hardness than the outer portion 94 which is cylindrical, is conformed to the radially outwardly turned ends of the portion 92, and is compounded and cured of a relatively softer material.

More specifically, the first or inner portion 92 is formed of a rubber compound cured to have an elastic modulus sufficiently high to hold the thick-walled cylinder firmly concentric with the axis in the collapsed condition and to restore the cylinder to its collapsed condition when inflating air is exhausted from the chamber 50. The second or outer cylindrical portion 94 is formed of a relatively soft cured gum rubber or rubber-like compound capable of readily conforming to an inextensible bead so as to wrap a ply partially around the bead and to hold such bead so embedded therein against axial displacement. The two portions are cured integrally as a cylinder having plane radial ends disposed closely adjacent to the respective flanges 70 and the inner cylindrical surface of which is carried on the radially outer surfaces of the outer pair 88,89 of control members.

Affixed coaxially on each end ring is a cylindrical extension 100 which extends axially outwardly from the respective end ring and provides support for an elastically inflatable membrane 110.

It will be apparent that the building drum in accordance with the invention is extremely simple in construction and is notable in that the drum is completely free of axially movable parts.

The elastic membrane 110 is a tubular cylindrical sleeve extending circumferentially about and axially along the cylinder 90, the respective end rings 60,62, and the cylindrical extensions 100. The membrane provides a cylindrical building surface for accommodating ply stock thereon and extends axially outwardly about to the axially outer ends of the respective cylindrical extensions and is there folded radially inwardly and extends thence axially inwardly along the respective extension. Its ends 112 are turned radially inwardly between the axially outer face of the respective end ring and the abutting face of the extension, being secured in the annular grooves 114.

A building drum in accordance with the invention can be constructed to provide a building surface of any suitable diameter and can be used without adjustment in any way to the drum to build tires, airsprings, and like articles, in which inextensible bead rings are disposed at any axial distance from each other. The drum is particularly useful for such products as small diameter tires, airsprings, rolling lobe diaphragms, and like annular articles having axially spaced inextensible beads.

Figure 3:
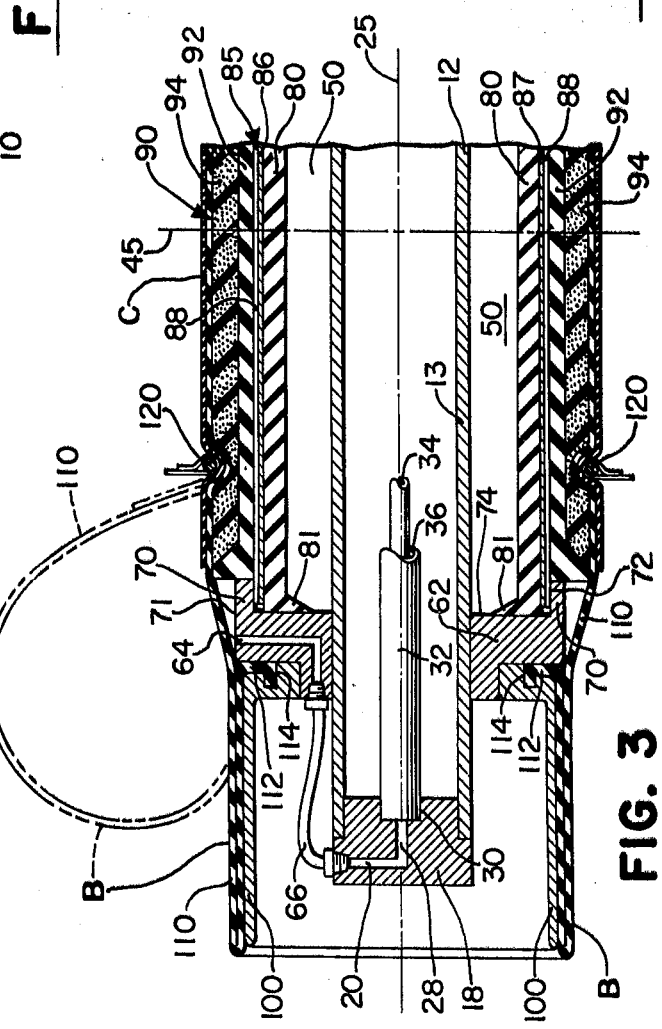
FIG. 3 is a partial elevation view of the drum of FIG. 1 illustrating the operation thereof.

In operation, a ply or plies of gum liner stock and/or of cord reinforced building stock is or are wrapped circumferentially about the collapsed drum. Inextensible bead rings such as that shown at 120 in FIG. 3 are then moved axially over the drum and positioned at the required axial spacing, in which position the beads may be held manually or by any suitable bead locating means (not shown). The simplicity and ease with which conventional bead locating devices can be adjusted axially in a tire building machine relative to the building drum used therein is too well known to require detailed description here.

With the respective beads suitably positioned along the axial length of the ply or plies wrapped about the drum and spaced radially outwardly from such plies, inflation air is admitted to the air chamber 50 at a pressure sufficient to expand the sleeve 80 and the control members 85 radially of the shaft 12 outwardly to the limit provided by the respective flanges 70. The thick-walled cylinder 90 is thereby expanded concurrently. Upon engagement with the bead and the ply thereunder the deformable cylinder 90, and particularly the softer outer portion 94, partially envelops the respective beads and at the same time forms an air seal isolating the respective end sections A and B of the membrane 110 extending axially outwardly from the beads from the center section C of the membrane extending between the beads. Compressed air is then admitted by way of the inner air passage 34 and the passages 64 in the respective end rings. The sections A and B axially outward of the beads then operate in a manner analogous to the ply turnup bladders used in known tire building drums. When inflated, as illustrated in FIG. 3, the membrane end sections A and B can then be urged axially in a conventional manner to complete the folding of the ply endings about the bead. The end sections of the membrane and the chamber 50 are then exhausted and the tire, or article, including the beads enfolded in the respective axial ends can be removed axially from the drum for further processing.

While certain representative embodiments and details have been shown for the purpose of illustrating the invention, it will be apparent to those skilled in the art that various changes and modifications may be made therein without departing from the spirit or scope of the invention.

What is claimed is:

1. A building drum for tires, airsprings, and like articles, said drum being free of and operable without axially movable rigid parts and comprising a center shaft, a pair of axially spaced apart rigid end rings each having a circumferentially and axially continuous cylindrical extension coaxially fixed thereon and an integral annular flange projecting axially toward the other end ring and terminating outwardly of the nearer bead ring of a pair thereof in such tire, airspring or like article intended to be built on the drum, a radially extensible sleeve disposed around the shaft between the end rings and terminating in sealing engagement with the respective end rings to form an air pressure chamber, a plurality of control members disposed axially and circumferentially of said sleeve, being engageable with said flanges on radial expansion of said sleeve and being stiff parallel to said shaft but flexible radially thereof, a unitary thick-wall cylinder of elastically deformable rubbery material for partially enveloping a bead ring or pair of bead rings disposed circumferentially therearound at any selected axial location therealong between the respective flanges, said cylinder being disposed around said control members and extending axially from one to the other of said flanges, and a single axially and circumferentially continuous elastic membrane providing a cylindrical building surface for accommodating a ply thereon and extending around and axially along said cylinder, said end rings and said cylindrical extensions to the respective ends of said extensions and thence axially inwardly along and in circumferential contact with the respective extensions, its ends being fixed adjacent the respective end rings, whereby portions of said membrane axially outwardly of bead rings partially enveloped by said cylinder can be moved axially to turn ply endings about said bead rings.

* * * * *